May 8, 1956 J. MAIR 2,744,571
EVAPORATING PROCESS
Filed Sept. 28, 1953
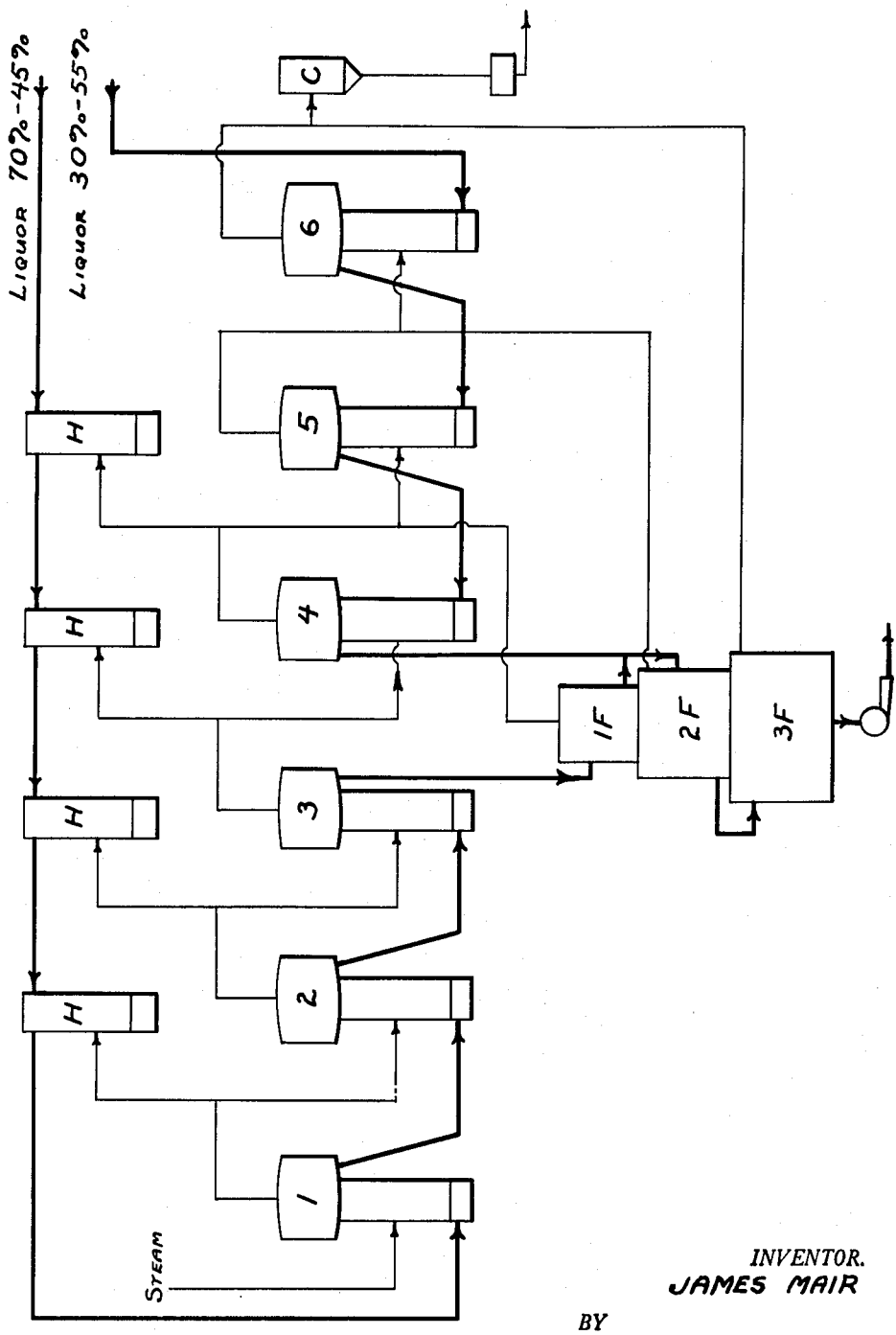
INVENTOR.
JAMES MAIR
BY
Jennings & Carter
ATTORNEYS United States Patent Office 2,744,571
Patented May 8, 1956

2,744,571
EVAPORATING PROCESS

James Mair, Birmingham, Ala., assignor to Goslin-Birmingham Manufacturing Company, a corporation of Alabama Application September 28, 1953, Serial No. 382,531

11 Claims. (Cl. 159—47)

My invention relates to a process of evaporating liquor in a multiple effect evaporative system and has for an object the provision of a process of the character designated in which viscous liquors containing solids either suspended or dissolved which at high concentrations crystallize out and form scale on the heating elements, may be carried to higher concentrations than heretofore found practical with a minimum deposition of scale.

A further object of my invention is to provide an evaporating process in a multiple effect evaporating system in which the liquor to be concentrated is fed in separate streams to separate groups of the effects and heated therein without attaining full concentration and is thereafter passed through a series of flash tanks out of contact with heating elements wherein it reaches the required concentration.

My invention comprises in part the provision of a process of concentrating sodium aluminate liquor in a multiple effect evaporating system in which the thin liquor to be evaporated is fed, divided flow, into the effects, and before final concentration, is passed through a series of flash tanks maintained at successively lower temperatures and pressures where it reaches final concentration. By flashing the liquor in a series of flash tanks instead of one, I make use of the sensible heat of the flashed vapor to concentrate liquor in some of the evaporator bodies. Also, excessive scaling is prevented and the most efficient use of the heating vapor is obtained.

As is well known in the art to which my invention relates, in the production of aluminum, bauxite ore is crushed and digested under pressure and temperature with a caustic liquor, usually lime and soda ash, which dissolves most of the $Al_2O_3$. In the subsequent treatment for the removal of such impurities as iron oxide and silicon dioxide, the liquor is diluted and must be brought back to concentration by evaporation in order to precipitate aluminum hydroxide which is further treated for the production of alumina. My invention is particularly concerned with the evaporation of the dilute sodium aluminate liquor. This requires the evaporation of about 18% of the feed liquor, but at that concentration its viscosity is so great it results in low coefficients of heat transfer; and, the concentrated liquor forms an insulating scale on the tubes of the evaporator heating elements especially at high temperatures.

The foregoing and other difficulties are overcome by means of my invention in which I divide the effects of a multiple effect evaporating system into two groups. About half of the liquor to be concentrated is fed to the first effect, being heated in three or four line heaters, each robbing vapor from succeeding bodies. The remainder of the liquor to be concentrated is fed to the last effect of the second group. The first portion of the liquor is evaporated, forward feed with relation to vapor flow, in the effects of the first group, but leave the last effect of the first group at less than full concentration. The remainder of the liquor is evaporated, backward feed with respect to vapor flow, being fed to the last effect of the second group and leaving the first effect of the second group at less than full concentration.

The liquor from the last effect of the first group enters the first of a series of flash tanks and the flashed vapor is passed to the heating element of a later effect in the second group, taking part in subsequent evaporation. The flashed liquor from the first liquor flash tank joins the liquor from the first effect of the second group, which is at the same temperature, and the combined streams enter a second flash tank, the vapor passing to the heating element of a later effect in the second group, taking part in evaporation.

The flashed liquor from the second flash tank enters a third flash tank, the vapor passing from there to a barometric condenser. It will be seen that as the liquor passes through the several flash tanks, which are maintained at progressively lower temperatures and pressures, there is a further concentration of the liquor out of contact with any heat transfer surface. Furthermore, the vapor from the flash tank is utilized for evaporation in the second group of effects. At no time is the liquor in any of the effects at full concentration and accordingly I have better heat transfer coefficients and avoid the more serious scaling of the heating units heretofore encountered.

In the accompanying drawing, the single figure is a diagrammatic flow sheet illustrating my process.

Referring to the drawing, I show an evaporating system embodying six effects numbered 1, 2, 3, 4, 5, and 6. Associated with the effects is a series of flash tanks numbered 1F, 2F, and 3F. The liquor flow through the effects is indicated by the heavy lines and arrows, while the vapor flow is indicated by the light lines and arrows. As shown, a maximum of 70% and a minimum of 45% (preferably 55 to 60% of the sodium aluminate liquor to be concentrated) is fed through a plurality of line heaters H to effect No. 1. Fresh heating steam is introduced into effect No. 1 and the liquor flows forward feed, through effects 1, 2, and 3. Vapor from effect No. 1 goes to effect 2 and also to one of the heaters H. Likewise the vapor from effect 2 goes to effect 3 and to another one of the heaters H. Vapor from effect 3 goes to effect 4 and to a third heater H, and vapor from effect 4 passes to effect 5 and to the fourth heater H. From 30 to 55% of the sodium aluminate liquor (preferably from 40 to 45%) is fed to effect No. 6 and passes backward feed with respect to vapor flow through effects 6, 5, and 4.

The liquor in effects Nos. 1, 2, and 3 is concentrated to the point where solids are about to settle out. From effect No. 3, the liquor passes to flash tank 1F where it is further concentrated, the flash vapor passing from tank 1F and joining the vapor from effect 4, which is at the same temperature, and thence to effect No. 5 and to the fourth heater H. The liquor after passing through effects Nos. 6, 5, and 4, is combined with the flashed liquor from flash tank 1F and the combined stream passes thence to flash tank 2F where it is further concentrated out of contact with any heating elements. The flash vapor from flash tank 2F is combined with the vapor from effect 5 and passes to effect 6 to aid in heating the liquor fed into that effect. The flashed liquor from flash tank 2F passes to flash tank 3F where it reaches its final concentration. The vapor flashed from flash tank 3F is combined with the vapor from effect 6 and passes to a barometric condenser C.

From the foregoing it will be apparent that I have devised an improved process for the evaporation of viscous liquors which have heretofore been found difficult to evaporate due to the low heat transfer coefficients and to scaling of the heating elements. While my process is particularly effective in the evaporation of sodium aluminate, it will be obvious that it may find application in the evaporation of other liquors, where high concentration in the evaporator effects is undesirable. I further wish it to be understood that I do not desire to be limited to the exact details of the process shown and described, for obvious modifications will occur to a person skilled in the art.

What I claim is:

1. The process of evaporating scaling liquor in a multiple effect evaporator which comprises feeding the liquor in two parallel independent streams to two groups of effects, one stream entering the last effect of one group and flowing backward with respect to vapor flow through said group, the other stream entering the first effect and flowing forward with respect to vapor flow through the other group of effects, whereby to concentrate the liquor in both groups of effects to a degree where solids are ready to crystallize out, flashing the stream of liquor from the last forward flow effect once in a succeeding body out of contact with heating elements, combining the stream from said body with the stream of liquor from the first backward flow effect, and flashing said combined stream through a plurality of bodies out of contact with heating elements.

2. The process set forth in claim 1 in which a major portion of the liquor is fed to the forward flow group of effects, and a minor portion to the backward flow group.

3. The process of evaporating scaling liquor in a multiple effect evaporator which comprises feeding the liquor in two parallel independent streams to two groups of effects, one stream entering the last effect of one group and flowing backward with respect to vapor flow through said group, the other stream entering the first effect and flowing forward with respect to vapor flow through the other group of effects, whereby to concentrate the liquor in both groups of effects to a degree where solids are ready to crystallize out, flashing the stream of liquor from the last forward flow effect once in a succeeding body out of contact with heating elements, combining the stream from said body with the stream of liquor from the first backward flow effect, and flashing said combined stream through a plurality of bodies out of contact with heating elements, and utilizing the vapor from all except the last of the last mentioned bodies as a heating medium in the backward flow group of effects.

4. In the evaporation of sodium aluminate liquor in a multiple effect system the process which comprises dividing the liquor feed between a first and second group of the effects, feeding a part of the liquor forward flow with respect to vapor flow in the first group of the effects, feeding the liquor in backward flow with respect to vapor flow through the second group of effects, passing the liquor from the first group of effects through the first of a series of flash tanks, combining the liquor from the first flash tank with the liquor from the first of the second group of effects and passing the combined streams through the remainder of the series of flash tanks.

5. In the evaporation of sodium aluminate liquor in a multiple effect system the process which comprises dividing the liquor feed between first and second groups of the effects, feeding a part of the liquor forward flow with respect to vapor flow in the first group of the effects, feeding the liquor in backward flow with respect to vapor flow through the second group of effects, passing the liquor from the first group of effects through the first of a series of flash tanks, combining the liquor from the first flash tank with the liquor from the first of the second group of effects and passing the combined streams through the remainder of the series of flash tanks and utilizing the vapor from all except the last in the series of flash tanks for heating in the last group of effects.

6. In the evaporation of sodium aluminate liquor in a multiple effect system, the process which comprises dividing the liquor feed between a first and a second group of the effects, feeding a portion of the liquor in forward flow with respect to vapor flow through said first group of effects, feeding the other portion of the liquor in backward flow with respect to vapor flow through said second group of effects, and passing the liquor from the last of the first group of effects and the first of the second group of effects through a series of flash tanks whereby the liquor attains full concentration in the liquor flash tanks and out of contact with heat transfer surfaces.

7. The process as defined in claim 6 in which only the first effect of the first group of effects is heated by fresh heating vapor.

8. The process as defined in claim 6 in which the second group of effects is heated by the vapors from the last of the first group of effects and the vapors from all except the last in the series of flash tanks.

9. In the evaporation of sodium aluminate liquor in a multiple effect system, the process which comprises dividing the liquor feed between a first and a second group of the effects, feeding a portion of the liquor in forward flow with respect to vapor flow through the first group of effects, utilizing fresh steam to heat the first effect of said first group of effects, feeding the other portion of the liquor in backward flow with respect to vapor flow through the second group of effects, passing the liquor from the last of the first group of effects through the first of a series of flash tanks, and passing the liquor from the first of said second group of effects together with the liquor from said first flash tank through the remainder of said series of flash tanks.

10. In the evaporation of sodium aluminate liquor in a multiple effect system, the process which comprises heating a portion of the liquor feed, passing the heated liquor in forward flow with respect to vapor flow through a group of effects, utilizing fresh steam for heating the first effect of the group, passing the remainder of the liquor feed in backward flow with respect to vapor flow through a second group of effects, and passing the liquor from the last of said first group of effects and the first of said second group of effects through a series of flash tanks, whereby the liquor attains full concentration in the flash tanks and out of contact with heat transfer surfaces.

11. The process set forth in claim 10 in which a major proportion of the feed is to the forward flow group effects and a minor proportion to the backward flow group of effects.

References Cited in the file of this patent

UNITED STATES PATENTS

| | | |
|---|---|---|
| 379,843 | Lillie | Feb. 28, 1888 |
| 1,944,548 | Ebner | Jan. 23, 1934 |
| 2,044,095 | Moore | June 16, 1936 |
| 2,181,731 | Hinckley | Nov. 28, 1939 |
| 2,459,302 | Aronson | Jan. 18, 1949 |
| 2,596,875 | Stewart | May 13, 1952 |
| 2,651,356 | Sadtler | Sept. 8, 1953 |